Patented Mar. 18, 1952

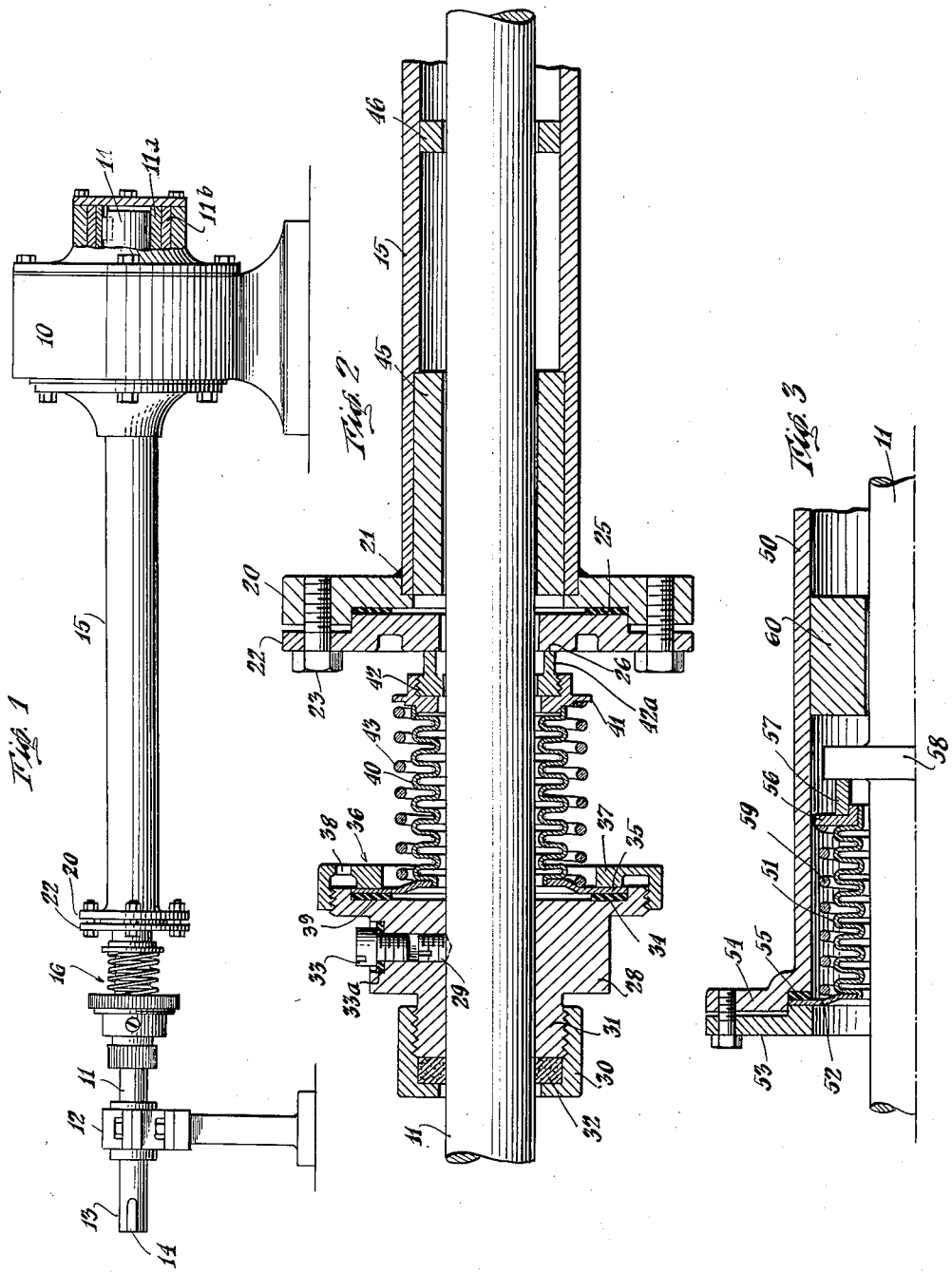

2,590,036

UNITED STATES PATENT OFFICE 2,590,036

SHAFT SEAL

Lawrence D. Potts, Kenmore, N. Y., assignor, by mesne assignments, to Union Carbide and Carbon Corporation, a corporation of New York Application December 16, 1944, Serial No. 568,425

2 Claims. (Cl. 308—36.2)

This application is a continuation in part of my former application Serial No. 450,244, filed July 9, 1942, and now abandoned. The invention is concerned with the provision of a seal for the operating shaft of a fluid device, particularly the rotary drive shaft of a rotary pump adapted to deliver at elevated pressure a highly volatile liquid of the class having a boiling point at atmospheric pressure in the range below 100° K. Liquid oxygen with a boiling point at atmospheric pressure of about 90° K. falls within this class and is specifically mentioned for the reason that the present construction is particularly advantageous in meeting certain difficulties presented in the handling thereof.

The general arrangement in such a rotary pump device involves a rotary shaft extending from the main housing requiring a seal between the shaft and housing to prevent leakage, particularly of gases under pressure generated from the volatile liquid. In view of the low boiling point of a liquid of the type noted above, the shaft seal must be adapted to operate in conjunction with a very cold pump, but it is necessary to keep the temperature of the seal above about 0° C. in order to prevent ice accumulations and freezing of parts, and in order, also, to avoid rapid wear and excessive leakage. On the other hand, if leakage of heat from a warm seal into the pump is permitted, it may produce gas binding and render the pump ineffective.

The ordinary stuffing box arrangement is unsuited to the conditions existing where a liquid which is highly volatile at ordinary temperatures is being handled. Such type of seal normally employs lubricants of the hydrocarbon type which freeze and become comparatively ineffective at the extremely low temperatures occurring with liquid oxygen, and, furthermore, such lubricants are organic in character possessing a strong affinity for oxygen. Without adequate lubrication, friction, wear and generation of heat are excessive, and the life of such type of seal is short.

The present invention is directed to a solution of the complex problems presented, of providing a seal which operates under sufficiently warm conditions as to be free of excessive wear and remain tight and effective for a long period of usage and at the same time avoid interference with the operation of the pump through leakage of heat thereinto. It embodies the features of a bellows type rotary seal in which the nose piece of the floating end of the bellows is guided in a dry atmosphere of the gas of the material, such as oxygen, being pumped, and the moisture laden outside air is excluded, avoiding accumulations of ice or frost, allowing the nose piece free self-adjustment. One of the relatively rotating annular bearing parts at the seal is composed of a solid material of a particularly effective character, which is self-lubricating, non-pervious to gas, and inert with respect to the gas being pumped, such as oxygen. The seal is associated with an elongated, thermally restricting drive shaft and housing therefor with an arrangement of guide bushing means which aids in maintaining the proper alignment of the parts and relieves the seal of the effects of relative displacement of shaft and housing and shaft vibration, without incurring the undesirable results of confining the drive shaft in a packed stuffing box. The association of elements operates also to provide a pocket of gas around the seal to aid in maintaining the thermal separation between the pump housing and the seal.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

Fig. 1 is a general view showing an apparatus incorporating the principles of the invention;

Fig. 2 is a cross-sectional view showing details of the seal and associated parts of Fig. 1; and Fig. 3 is a cross-sectional view of a modified form of seal capable of being employed in the general combination of Fig. 1.

The arrangement of Fig. 1 illustrating an application of the present invention includes an operating device 10 which may be any one of various types designed to operate on a volatile liquid, but, as here shown, is intended to represent a multi-stage turbine pump adapted for pumping liquid oxygen which would ordinarily include heat insulating means for the casing (not shown). The pump is provided with a drive shaft 11 extending outwardly, to the left in Fig. 1, the outer end being provided with an outboard bearing support shown generally at 12 of a suitable type, the extreme outer end 13 of the shaft having a keyway 14 for the application of a power driving means. The inner end of shaft 11 will have a suitable support within the pump housing, such as is illustrated generally at the broken-away section comprising a sleeve 11a keyed on the enclosed end of the shaft and supported in a bearing member 11b. The pump 10 is provided with a tubular member 15 extending for a considerable distance outwardly from the pump designed to house the shaft 11, there being located at the outer end of the sleeve 15 a seal indicated generally at 16 in Fig. 1, the details of which are shown more clearly in the cross-sectional view of Fig. 2. It is noted that the shaft seal is located reasonably close to the outer shaft bearing support, which arrangement, in conjunction with guide bushing means for the shaft located within the sleeve housing 15, to be described shortly, avoids substantially any disturbing influence on the shaft seal performance, of shaft whip or other displacement of the shaft with respect to the sleeve 15.

Referring now to Fig. 2, it will be seen that the outer end of the tubular member 15 is provided with an enlarged flange portion 20 secured to the member 15 by any suitable means, such as by welding as shown at 21. The outer end of the drive shaft housing has a thrust bearing surface extending around the opening for the shaft. This preferably is provided by an auxiliary plate 22 secured to the flange member 20 by suitable means such as by the cap screws 23, a sealing gasket 25 being clamped between the two plates 20 and 22. The annular bearing surface, indicated at 26, cooperates with a rotary sealing means, the details of which will now be described.

A supporting ring member 28 is fitted closely on the shaft 11 being secured in position normally by the setscrew 29. The outer end of the supporting casting 28 is provided with a suitable packing means to form a fluid-tight joint between the member 28 and the shaft 11, this comprising in the present case a gland nut 30 having a screw-threaded engagement on the nipple 31 of the supporting ring 28, the packing gland 30 being designed to compress suitable packing means 32. It is necessary also that leakage at the setscrew 29 be prevented, one arrangement adapted to that end being shown, in which a sealing cap screw 33 is threaded into the same opening as, and over the setscrew 29, and adapted to bear against a copper gasket 33a. The inner side of the supporting ring 28 is provided with a counterbore 34 adapted to receive the annular plate 35, the plate being clamped therein by means of the annular nut 36 having internal threads adapted to engage corresponding threads formed on the periphery of the supporting member 28, and having also an inner annular portion 37 adapted to bear directly against the plate 35. The nut 36 may be provided with uniformly spaced openings 38 for the application of a spanner wrench. To assist in maintaining a tight joint a gasket 39 is provided between the plate 35 and the bottom of the counterbore 34 of the supporting member 28.

Secured to the plate 35 in a gas-tight manner is an expansible bellows 40 which may comprise an accordion-like member of brass welded to the plate 35. The inner end of the bellows in turn has secured thereto a ring 41, the joint being made gas-tight and strong as by welding. The supporting ring 41 carries a sealing ring 42 adapted to bear against the companion bearing surface 26 of the stationary plate member 22. The expansive force of the bellows 40 preferably is supplemented by the use of a coiled compression spring 43 located concentrically with the bellows and between the plate 35 and the inner ring 41.

The sealing ring 42 is of special composition of a character to be self-lubricating, not requiring the use of any auxiliary liquid lubricants. A particularly good sealing ring is one comprised of a graphitic carbon, the efficiency of which may be enhanced by impregnation with a material of good lubricating character and fairly high melting point, such as a chlorinated naphthalene. The material described, in addition to having good self-lubricating and wearing qualities, is also practically impervious to gas leakage therethrough. The companion bearing surface 26 on the plate member 22 is of a hard polished character, a "Stellite" or chromium plated surface having been found to give excellent service in this respect.

The particular shape and relation of the sealing ring 42 to the associated parts and the manner of securing it in place play an important part in the success of the device as a whole. As shown, the supporting ring 41 is counterbored to receive the sealing ring, the ring and counterbore being provided with screw threads for securing the sealing ring therein. The screw-threaded fastening means is supplemented by the use of a suitable cement. The threads should be of a hand with respect to the direction of rotation of the shaft such as to tend to tighten in normal operation of the shaft 11. This arrangement of providing the graphitic carbon ring 42 with an outer metal supporting band and securing the ring in place by a combined screw-threaded and cemented fastening means is particularly effective in strengthening the construction and accomplishing a tight joint. The sealing ring 42 is provided with a bore adapted to receive the drive shaft 11, the bore having a slight clearance so that it is free to slide on the shaft 11 but the arrangement serving as a guide and support on the shaft for the sealing ring and the inner floating end of the bellows and associated parts. The inner end of the sealing ring toward the bearing plate 22 has an enlarged counterbore resulting in a thinner ring or nose piece 42a. The thickness of this ring part 42a in the radial direction may be varied to suit the conditions, it being noted in general that within reasonable limits the thinner the contacting ring surface is, the more effective will be the seal from the standpoint of preventing leakage. A reasonable thickness must be provided also to insure adequate strength and that wear will not be too rapid. In a pump device like that shown, a thickness in the radial direction for the ring part 42a of about $\frac{3}{32}$ inch has proved very satisfactory. The type of sealing ring construction shown having an enlarged section threaded into the supporting ring 41 and a flange portion of reduced thickness forming the bearing surface provides sufficient strength to resist the gas pressures and torsional stresses and at the same time gives a tight seal. The ring 42a is made sufficiently long, that is, of an extent in the axial direction, such as to provide a considerable wearing life.

In the proper functioning of the seal it is important that the pressure between the nose piece 42a and its complemental bearing surface 26 be so adjusted as to be sufficient to provide a good seal but without being so great as to result in excessive wear, and that the pressure be relatively constant as some wear takes place. To this end, there is provided a bellows of considerable length with a relatively large number of convolutions, and a spring which is made large in diameter and therefore placed outside the bellows and likewise having as many convolutions as is feasible. In the construction shown, the spring has a diameter of over 2 inches and 8 or more convolutions in a free length of about 2½ inches. The bellows should preferably have at least about 12 convolutions.

In addition, for initial setting and for major adjustments, the outer supporting member 28 for the bellows is made adjustable along the shaft 11. As wear reaches a certain point, the member 28 through the medium of setscrew 29 may be adjusted to the right. It is to be noted also that the present arrangement is such as to provide a supplemental automatic means for increasing the pressure between the bearing surfaces as the gas pressure within the housing increases. This results from the fact that the inner diameter of the sealing ring 42a is less than the mean effective diameter of the bellows, the mean effective diameter being based on the mean value of maximum and minimum internal diameters of the bellows. In other words, there is a preponderance of effective area movable to the right subjected to the internal pressure so that increased internal pressure tends to increase the pressure between the sealing ring 42a and its companion surface 26.

The shaft seal is designed in such manner as to be readily replaceable in whole or in part, as, for example, a new carbon ring, without disassembling the pump.

Various additional somewhat more detailed features will now be described, which cooperate to result in the success of the seal as a whole. Among these is the provision of the tubular member 15 extending for a considerable distance from the main pump housing. The length of this tube may be varied to suit conditions, as, for example, in an arrangement which employs a tube having an outer diameter of about 2 inches, the length thereof was about 8 to 10 inches. The low heat transference is further accomplished by the use of a tube that, by construction or material, provides low heat conduction. The low conduction is accomplished in the present case by the use of a material having high strength so that the tube can be thin walled, and also having relatively low heat conductivity such as "stainless" steel of 18% chromium and 8% nickel composition. Likewise, the drive shaft 11 may be of a material or design as to have a low heat conduction. The maintenance of a suitably warm temperature at the seal is further aided in conjunction with the above by the provision of the enlarged flange portions 20 and 22, which serve as a heat reservoir means. When the shaft seal, for example, tends to develop excessive heat of friction, much of the heat is dissipated through the flange portions to the atmosphere, thus reducing the tendency of heat to be transferred into the pump proper. On the other hand, the reservoir also acts to draw heat from the atmosphere when the seal parts tend to run too cold or when the apparatus is not in operation. Thus, the reservoir tends to hold the shaft seal more nearly to a uniform temperature approaching room temperature, which is ideal for a minimum of friction and wear. The above function of temperature control at the seal may be further augmented by providing flange 22 and also, if desired, flange 20 with fin portions.

A further feature of importance is the provision of the bushing 45, which serves a double function as a guide for the outer end of the tube 15 with respect to the shaft, and as a fluid barrier. The bushing is preferably made of a solid self-lubricating material which may be similar to that of the sealing ring 42. Sufficient clearance is provided in the bore of bushing 45 so that when the shaft 11 and the bushing are in exact axial alignment, the shaft does not have a supporting contact in the bushing and the latter is not strictly a bearing for the shaft 11, but rather serves as a means for limiting misalignment between tube 15 and shaft 11 at the shaft seal. It damps out any vibrations of the long flexible shaft during operation; and, also, in the event that distortions of the pump or pump base caused by drastic changes in temperature occurring when the pump is cooled to liquid oxygen temperature tend to cause the tube 15 to move radially in relation to the shaft, the bushing 45 limits any such tendency.

A further important function of the bushing 45 is that it serves as a barrier and as such keeps liquid oxygen away from the shaft seal when the pump is shut down, preventing frost accumulation and freezing of the shaft seal. In normal operation the barrier 45 serves to maintain a substantially stagnant body of gas to the left side thereof so that the nose piece of the flexible bellows is bathed internally in an atmosphere of dry oxygen gas. In this respect, it is noted that the nose piece 42 has a bore providing a slight clearance around the shaft 11 so that it is in effect merely guided on the shaft and has a free sliding movement enabling self-adjustment with respect to the bearing surface 26 on the plate 22. If desired, an additional annular barrier member 46 may be provided, which likewise has a slight clearance around the drive shaft 11 and which doubly serves to insure the maintenance of a stagnant pocket of gas at the outer end of the tubular member 15 around the seal.

In general, the several features cooperate to insure that the nose piece 42 is guided in an oxygen gas atmosphere and external moisture laden atmosphere is entirely kept away from the guide point and free endwise self-adjusting movement of the bellows is permitted at all times. Furthermore, the gas pocket in conjunction with the means for thermally isolating it, and the flange heat reservoir means, insure the maintenance of the seal at a suitable temperature at least not substantially below 0° centigrade so as to provide good bearing operating temperatures and prevent accumulations of ice and frost around the seal, which would be destructive of its continued effectiveness.

Fig. 3 shows another form of seal adapted to be employed in the general combination of Fig. 1 and embodying the principles of the invention but with certain elements reversed as to position. In this form, the bellows and its nose piece have a stationary support at the end of the shaft housing and the complemental bearing surface rotates with the shaft.

The details of construction include a shaft housing 50 corresponding to the housing 15 of Fig. 1 but of a somewhat larger diameter to accommodate the parts. The bellows 51 is hermetically secured to a supporting disk 52 which is clamped as shown between the plate 53 and the enlarged flange portion 54 on the outer end of the tubular housing 50. A gasket 55 is preferably inserted between the disk 52 and the bottom of the receiving recess in the flange portion 54 of the housing.

At its opposite or inner end the bellows 51 is hermetically secured to an annular disk 56, and the disk 56 in turn has secured thereon an annular nose piece 57 of a self-lubricating material, which may be similar in composition to the nose piece 42 of the sealing means shown in detail in Fig. 2. Formed integrally with or secured on the shaft 11 is a complemental annular ring 58 against which the nose piece 57 is adapted to engage. The annular disk 56 is of a dimension to have a slight clearance with respect to the inner bore of the sleeve 50 such as to be guided therein in the endwise movement of the free end of the bellows and its nose piece. A spring 59 surrounds the bellows 51 and is arranged to exert its expansive force against the annular disks 52 and 56 secured to the opposite ends of the bellows. Adjustment of the bellows to compensate for nose piece wear can be obtained by changing the thickness of the gasket 55.

Within the sleeve 50 is a guide bushing 60 which serves a function similar to the bushing 45 of the seal of Fig. 2, and may be of similar self-lubricating material. In other words, it is not, strictly speaking, a bearing for the shaft 11, but is provided with a bore with a slight clearance for shaft 11 but having a sufficiently close fit to maintain the sleeve 50 and the seal elements in close alignment with the shaft 11. It also serves the dual purpose, similar to bushing 45 of Fig. 2, of a barrier excluding from the rotary seal parts any liquid which might seep into the sleeve 50 from the pump housing proper. The bushing, furthermore, serves to maintain a substantially stagnant pocket of gas to the left, so that in the case of pumping liquid oxygen for example, the exterior of the bellows and its nose piece 57 are maintained in a bath of dry oxygen gas and the coacting seal parts for this reason and because of their enclosed position are maintained free of collections of frost or ice. The enlarged flange parts at the outer end of the sleeve serve as a heat reservoir between the sealing elements and the atmosphere. In general, the arrangement enables the seal parts to operate at a suitably warm temperature free of frost deposits and restricts to a very small amount heat leakage into the pump housing proper.

Preferably the diameter of the sealing ring 57 is made greater than the mean effective diameter of the bellows, resulting in a preponderance of effective area exposed to the external pressure on the seal over that on the bellows, so that increased external gas pressure tends to increase the total pressure between the nose piece 57 and its complemental bearing surface on the annular ring 58.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a rotary pump for highly volatile liquefied gas having a pump body, an elongated tubular shaft housing connected thereto and projecting outwardly therefrom, a rotary drive shaft connected to said pump and projecting outwardly through said tubular housing, and an end thrust type of seal between said shaft and the outer end of said housing, said seal including complementary annular thrust bearing surfaces one of which comprises a ring of self-lubricating material substantially impervious to gas, said tubular housing having an inner diameter considerably larger than the shaft diameter, a guide bushing for said shaft of self-lubricating material located in said housing inwardly from said seal, said bushing also being adapted and arranged to form a barrier against fluid circulation and to provide a pocket of the material being pumped in a dry superheated gaseous state extending adjacent to and inwardly of said seal.

2. In a rotary pump for pumping liquefied oxygen having a pump body, an elongated tubular shaft housing connected thereto and projecting outwardly therefrom, a rotary drive shaft connected to said pump and extending outwardly through said tubular housing, said housing having an inner diameter considerably larger than the diameter of said shaft and having an end thrust type of seal between the outer end of said housing and said shaft, said seal including complementary annular thrust bearing surfaces one of which comprises a ring of graphite carbon impregnated with a relatively high melting point wax-type lubricant substantially inert to oxygen, and a bushing of self-lubricating material adapted to form a guide between the outer portion of said housing and shaft located in said housing inwardly of said seal and arranged to form also a barrier against fluid circulation and to provide a pocket of dry superheated oxygen extending adjacent to and inwardly from said seal.

LAWRENCE D. POTTS.

REFERENCES CITED

The following references are of record in the file of this patent:

UNITED STATES PATENTS

| Number | Name | Date |
| --- | --- | --- |
| 110,582 | Murfey | Dec. 27, 1870 |
| 120,003 | Simmons | Oct. 17, 1871 |
| 1,292,197 | Williams | Jan. 21, 1919 |
| 1,825,918 | Peltier | Oct. 6, 1931 |
| 1,841,298 | Ploeger | Jan. 12, 1932 |
| 1,859,378 | Buerger | May 24, 1932 |
| 1,866,967 | Durham | July 12, 1932 |
| 1,874,324 | Macmeeken | Aug. 30, 1932 |
| 1,912,926 | Wegener | June 6, 1933 |
| 2,249,930 | Bailey | July 22, 1941 |
| 2,296,640 | Hansen | Sept. 22, 1942 |
| 2,340,747 | Hansen | Feb. 1, 1944 |